US007772304B2

(12) United States Patent
Ohrbom et al.

(10) Patent No.: US 7,772,304 B2
(45) Date of Patent: Aug. 10, 2010

(54) PLASTICIZING COMPONENT AND A CURABLE COATING COMPOSITION INCLUDING THE SAME

(75) Inventors: Walter H. Ohrbom, Hartland Township, MI (US); John E. Boisseau, Bloomfield Hills, MI (US)

(73) Assignee: BASF Corporation, Southfield, MI (US)

( * ) Notice: Subject to any disclaimer, the term of this patent is extended or adjusted under 35 U.S.C. 154(b) by 827 days.

(21) Appl. No.: 11/560,932

(22) Filed: Nov. 17, 2006

(65) Prior Publication Data

US 2008/0119592 A1      May 22, 2008

(51) Int. Cl.
*C08K 5/3492* (2006.01)
*C07D 251/30* (2006.01)

(52) U.S. Cl. .............. 524/101; 524/492; 252/403; 544/192; 544/218

(58) Field of Classification Search .......... 524/101, 524/492; 252/403; 544/192, 218
See application file for complete search history.

(56) References Cited

U.S. PATENT DOCUMENTS

| | | | |
|---|---|---|---|
| 3,637,557 A * | 1/1972 | Little | 544/221 |
| 5,036,125 A * | 7/1991 | Perrin | 524/405 |
| 6,531,560 B1 | 3/2003 | Campbell et al. | |
| 6,696,159 B2 | 2/2004 | Campbell et al. | |
| 6,696,535 B2 | 2/2004 | Campbell et al. | |
| 6,710,103 B2 | 3/2004 | Norris et al. | |
| 6,855,789 B2 | 2/2005 | Campbell et al. | |
| 6,858,693 B2 | 2/2005 | Campbell et al. | |
| 2005/0074617 A1 | 4/2005 | Lin et al. | |
| 2005/0100740 A1 | 5/2005 | Lin et al. | |
| 2006/0025534 A1 | 2/2006 | Johnson et al. | |
| 2006/0045965 A1 | 3/2006 | Lin | |
| 2006/0047036 A1 | 3/2006 | Lin | |

FOREIGN PATENT DOCUMENTS

| | | |
|---|---|---|
| DE | 87879 A | 11/1972 |
| WO | 99/46343 A1 | 9/1999 |

OTHER PUBLICATIONS

Notification of Transmittal of the International Search Report for PCT/US2007/075141, filed Mar. 8, 2007, on 2 pages, International Search Report, on 3 pages, and the Written Opinion, on 7 pages.

* cited by examiner

*Primary Examiner*—Kriellion A Sanders
(74) *Attorney, Agent, or Firm*—Howard & Howard Attorneys PLLC

(57) ABSTRACT

A curable coating composition includes a plasticizing component. The plasticizing component includes an isocyanurate core and at least one low surface tension group pending from the isocyanurate core. The low surface tension group may be a) a fatty chain includes at least 6 carbon atoms, b) a silicon-containing group having at least 1 silicon atom, c) a fluorocarbon, and combinations thereof. The low surface tension group may have cross-linkable functional groups pending therefrom. In addition to the plasticizing component, the curable coating composition further includes a resin component and a crosslinking agent that is reactive with the resin component. The curable coating composition including the plasticizing component is capable of forming a cured film that has resistance to both cracking and etching that, to date, has not been achieved with known plasticizing components.

33 Claims, No Drawings

PLASTICIZING COMPONENT AND A CURABLE COATING COMPOSITION INCLUDING THE SAME

BACKGROUND OF THE INVENTION

1. Field of the Invention

The present invention generally relates to a curable coating composition. More specifically, the present invention relates to a curable coating composition including a plasticizing component that forms a cured film having excellent resistance to cracking and etching.

2. Description of the Related Art

Curable coating compositions and their use in a wide variety of coating applications are known in the art. In a curable coating composition, a resin component, along with a suitable cross-linking agent, generally produces a cured film having good film properties, such as resistance to etching, excellent gloss, etc. Such properties are particularly important when the curable coating composition is to be used as a clearcoat in automotive coating applications, in which the clearcoat is the first line of defense against the environment for an underlying substrate such as a metal panel of a vehicle. In addition to excellent etch resistance, resistance to cracking is also important. Without excellent resistance to cracking and etching, the clearcoat may provide insufficient protection to prevent corrosion and damage of the underlying substrate.

In general, high crosslink density and/or high glass transition temperature, $T_g$, are desirable traits of the cured film for good etch resistance. Low crosslink density and/or low cured film $T_g$ are desirable traits for good crack resistance. Although the cured films formed from the current coating compositions may include plasticizing components that provide good resistance to cracking, the plasticizing components provide poor resistance to etching of the cured film from corrosive chemicals Because most plasticizing components are materials with very low $T_g$ (<–20° F.), and are non-crosslinkable. In many cases, relatively large amounts of the plasticizing component must be included in the curable coating compositions in order to provide acceptable resistance to etching to the cured films. The plasticizing components function to "anneal" the cured film, i.e., the plasticizing components relieve stress that builds up in the cured film. However, in doing so, they lower the overall $T_g$ of the cured film. This leaves the system open to poor etch resistance and may allow contaminants in the atmosphere to penetrate the cured film.

An alternative way to reduce cracking is to use resins and crosslinkers that will reduce the overall crosslink density of the coating. For example, blocked hexamethylene diisocyanate and partially defunctionalized melamine have been added to curable coating compositions to increase resistance to cracking of the cured films formed from the curable coating compositions. Further, resin components including polyester moieties have also been included in the curable coating compositions to increase resistance to cracking of the cured films formed from the curable coating compositions. However, the lowering of the crosslink density has the negative effect of lowering resistance to etching of the cured film and making the cured system open to environmental degradation.

One of the problems with the current plasticizing components or with the use of resins and crosslinkers that reduce the overall crosslink density is that the additives are typically uniformly dispersed in the curable coating composition. Resistance to cracking and etching is most important adjacent an outer surface of the cured film, since crack propagation initiates at the surface of the cured film. As such, much of the plasticizing component that is not adjacent to the surface of the cured film is unnecessary, which adds cost to the curable coating compositions. Furthermore, as alluded to above, relatively large amounts of the plasticizing components must be included in the curable coating compositions to provide acceptable resistance to etching to the cured films. As such, the inclusion of the plasticizers in the coating composition and/or the reduction of crosslink density has the negative effect of decreasing resistance to etching of the cured films formed from the curable coating compositions. A combination of resistance to both cracking and etching is important in order to prevent corrosion and damage of the underlying substrate.

Due to the deficiencies of the known plasticizing components, it would be advantageous to provide a plasticizing component and a curable coating composition including the plasticizing component that is capable of forming a cured film that has resistance to both cracking and etching that, to date, has not been achieved with known plasticizing components.

SUMMARY OF THE INVENTION AND ADVANTAGES

The subject invention provides a plasticizing component and a curable coating composition including the plasticizing component. The plasticizing component includes an isocyanurate core and at least one low surface tension group pending from the isocyanurate core. The low surface tension group is selected from the group of a) a fatty chain having at least 6 carbon atoms, b) a silicon-containing group having at least 1 silicon atom c) a fluorocarbon, and combinations thereof. The low surface tension group has from 0 to 3 cross-linkable functional groups pending therefrom. In addition to the plasticizing component, the curable coating composition further includes a resin component and a crosslinking agent that is reactive with the resin component.

The curable coating composition including the plasticizing component is capable of forming a cured film that has resistance to both cracking and etching that, to date, has not been achieved with known plasticizing components. More specifically, excellent resistance to etching is attributable to the isocyanurate core of the plasticizing component, which imparts hardness to the cured film, but does not prevent the cured film from self-annealing to relieve stress that could cause cracking. The low surface tension group is hydrophobic and enables the plasticizing component to migrate to a surface of the cured film during curing and allows the plasticizing component to act as a plasticizer. The plasticizing component may be reactive with the crosslinking agent, the resin component, or both the crosslinking agent and the resin component at the cross-linkable functional group when the cross-linkable functional group is present. However, the cross-linkable functional group typically has a reactivity with the crosslinking agent that is less than or equal to a reactivity of the resin component with the crosslinking agent. As a result of the relatively low reactivity of the cross-linkable functional group, when present, curing of the plasticizing component is retarded for a sufficient amount of time to allow migration of the plasticizing component to the surface of the cured film, which further increases resistance to cracking and etching of the cured film. The cured film formed from the curable coating composition is also expected to have excellent scratch and mar resistance.

DETAILED DESCRIPTION OF THE PREFERRED EMBODIMENT

A curable coating composition of the present invention is useful in a wide variety of coating applications, particularly in automotive coating applications. The curable coating composition includes a resin component, a crosslinking agent that is reactive with the resin component, and a plasticizing component. The plasticizing component enables the curable coating composition to form cured films having excellent resistance to both cracking and etching. As such, the curable coating composition of the present invention is typically used as a clearcoat in automotive coating applications in order to prevent corrosion or damage to a substrate or to underlying layers, such as a basecoat layer, an electrocoat layer, etc.

The coating composition may be applied over the basecoat layer on the substrate or, alternatively, may be applied directly to the substrate in the absence of any other layers. The substrate may be formed from any type of material, but is typically formed from metal. A common substrate may be a metal panel of a vehicle or a plastic part. After applying the curable coating composition, the coating composition is typically cured at elevated temperatures of at least about 180° F. for a period of at least 25 minutes in order to form the cured film. For example, the coating composition may be cured at a temperature of about 180° F. for a period of about 30 minutes. Alternatively, the coating composition may be cured at a temperature of about 275° F. for a period of about 25 minutes. Curing temperatures and times may be varied depending on the substrate, curing conditions, for example plant temperature and humidity, coating formulation and level of cure desired.

The resin component used in the present invention may be selected from the group of polymers, oligomers, materials, and combinations thereof. Suitable polymers and oligomers for purposes of the present application include, but are not limited to, those having at least three monomeric units and/or those having a number average molecular weight of at least 1500 Daltons. A material, for purposes of the present application, is a compound or mixture of compounds that is not derived from monomeric units. Non-limiting examples of polymers that are suitable for purposes of the present application include acrylic resins, polyester resins, polyurethane resins, vinyl resins, polycarbonate resins, epoxy resins, polysiloxane resins, and combinations thereof. Non-limiting examples of oligomers that are suitable for purposes of the present application include the simple reaction products of a di-isocyanate with a functionalization agent such as a hydroxy acid, hydroxy carbamate, and/or hydroxy acrylate. Non-limiting examples of materials that are suitable for purposes of the present application include fatty acids, dimers and trimers of fatty acids, didecanoic acid, and combinations thereof. In some cases, the same reactants used to form a polymer can also be used to from the oligomer or material, such as with some alkyd-based resins. The resin may also include mixtures of polymers, oligomers, and materials, as alluded to above. Specific examples of resins that are suitable for purposes of the present application are dual-hydroxy carbamate-functional acrylate resins that are disclosed in U.S. Pat. Nos. 6,858,693, 6,855,789, 6,696,535, 6,696,159, and/or 6,531,560, the disclosures of which are hereby incorporated by reference in their entirety.

As also alluded to above, the resin component is reactive with the crosslinking agent, and thus includes one or more functional groups that are reactive with the crosslinking agent. The specific functional groups of the resin component may include, for example, active hydrogen donors such as hydroxyl functional groups, amino functional groups, acid functional groups, carbamate and urea functional groups, amide functional groups, activated methylene functional groups, and combinations thereof. The functional groups of the resin component may alternatively include active hydrogen acceptor groups such as anhydride functional groups, epoxy functional groups, activated aminoplast functional groups, free or blocked isocyanate functional groups, cyclic carbonate functional groups, silane functional groups, and combinations thereof. The functional groups of the resin component may alternatively include groups that can undergo addition reactions such as activated vinyl groups including acrylate functional groups and the combination pair of isocyanurate with epoxy. The specific functional groups of the resin component depend on the specific functional groups of the crosslinking agent, as described below. Further, the resin component can have a mixture of the above types of functional groups provided that any reactivity between the different groups can be controlled, i.e., so long as the mixture of the above types of functional groups does not hurt the storage stability of the paint. Typically, the resin component has functional groups that are active hydrogen acceptor groups and/or functional groups that can undergo addition reactions.

The functional group or groups of the resin component may be masked or blocked in such a way so that they become unblocked and available for reaction with the crosslinking agent under desired curing conditions, such as at elevated temperatures.

The resin component is typically present in the curable coating composition in an amount of at least 30 parts by weight solids, more typically in an amount of from about 40 to about 70 parts by weight solids, most typically in an amount of from about 50 to about 60 parts by weight solids, based on 100 parts by weight of all solids in the curable coating composition.

The crosslinking agent is present to enable curing of the curable coating composition and to impart excellent film properties to the cured film formed from the curable coating composition. Typically, when the resin component has active hydrogen donor groups, the crosslinking agent has active hydrogen acceptor groups such as those described above as suitable for the resin component. Particularly suitable crosslinking agents that include the active hydrogen acceptor groups, for purposes of the present invention, are aminoplasts. The aminoplasts comprise the reaction product of an aldehyde with an activated amine with or without additional etherification. None-limiting examples of activated amines are amines connected to aromatic rings, such as benzene, melamine, benzoquatamine; primary carbamates; urea; amides; vinyl amines; and combinations thereof. However, it is to be appreciated that when the resin component includes active hydrogen acceptor groups, the crosslinking agent may include active hydrogen donor groups. As set forth above in the context of the resin component, in some cases, mixtures of functional groups can be used. For example, in one embodiment, the resin component may include acid functional groups, hydroxy functional groups, carbamate functional groups, and/or acrylic functional groups. In this example, the crosslinking agent may include aminoplast functional groups, isocyanate functional groups, silane functional groups, epoxy functional groups, and/or acrylic functional groups. The reaction between the functional groups of the resin component and the functional groups of the crosslinking agent can be activated by heat and/or UV light. Suitable cross-linking agents for purposes of the present invention are selected from the group of blocked polyisocyanates, blocked polyisocyanurates, polycarboxylic acid halides, aminoplast resins, and combinations thereof. As appreciated by those skilled in the art, an aminoplast resin is formed by the reaction product of a formaldehyde and an amine where the preferred amine is a urea or a melamine. In other words, the aminoplast resin may include urea resins and melamine-formaldehyde resins. One specific example of a suitable cross-linking agent, for purposes of the present invention, is a methylated melamine-formaldehyde crosslinking agent with a medium to high degree of alkylation, low methylol content and medium to high imino functionality, commercially available from Cytec Industries, Inc. of West Patterson, N.J.

The crosslinking agent is typically present in the curable coating composition in an amount of at least 5 parts by weight solids, more typically in an amount of from about 10 to about 50 parts by weight solids, most typically in an amount of from about 15 to about 25 parts by weight solids, based on 100 parts by weight of all solids in the curable coating composition.

The curable coating composition may further include a catalyst for catalyzing a reaction between the resin component and the crosslinking agent, and optionally further catalyzing a reaction between the plasticizing component and the crosslinking agent. Suitable catalysts for purposes of the present invention may be selected from the group of tin catalysts, acid catalysts, acid phosphates, aromatic acids, and combinations thereof. Specific examples of suitable tin catalysts include dibutyltin diacetate (DBTDA) and dibutyltin dilaurate (DBTDL). Specific examples of suitable acid catalysts include sulfonic acids including dodecylbenzene sulfonic acid (DDBSA), dinonylnapthalene sulfonic acid (DNNSA), dinonylnapthalene disulfonic acid (DNNDSA); and p-toluene sulfonamine (PTSA). The catalyst is typically present in the curable coating composition in an amount of from 0.1 to 3 parts by weight solids, more typically from 1 to 2 parts by weight solids, based on 100 parts by weight of all solids in the curable coating composition.

The curable coating composition of the present invention may be utilized, for example, in the form of a substantially solid powder, as a liquid that does not require additional solvent, or as a dispersion. When the curable coating composition is in the form of a dispersion, a solvent is typically used. Suitable solvents act as a solvent with respect to both the resin component and the crosslinking agent. In general, as known in the art, the solvent may be any of a number of organic solvent(s), including water, depending on the solubility characteristics of the resin component, the crosslinking component, and the plasticizing component in the coating composition. In one embodiment, the solvent is a polar organic solvent. The polar solvent may be a polar aliphatic solvent or polar aromatic solvent, such as a ketone, ester, acetate, aprotic amide, aprotic sulfoxide, or aprotic amine. Examples of useful solvents include methyl ethyl ketone, methyl isobutyl ketone, m-amyl acetate, ethylene glycol butyl ether-acetate, propylene glycol monomethyl ether acetate, xylene, n-methylpyrrolidone, or blends of aromatic hydrocarbons. In another embodiment, the solvent is water or a mixture of water with small amounts of aqueous co-solvents. Suitable co-solvents include acetates such as butyl acetate, hexyl acetate, and octyl acetate; glycol ethers and glycol ether acetates, such as propylene glycol ether and propylene glycol monomethyl ether acetate; and ketones, such as methyl propyl ketone, methyl isobutyl ketone, and methyl hexyl ketone. Glycol ethers and glycol ether acetates are especially preferred. Further, the solvent may include non-polar aromatic and/or aliphatic solvents.

The solvent may be present in the curable coating composition in an amount of from about 10 to about 60 parts by weight, more typically in an amount of from about 30 to about 50 parts by weight, based on 100 parts by weight of the curable coating composition.

The plasticizing component includes an isocyanurate core. As used herein, "isocyanurate core" includes molecules represented by the following general structure:

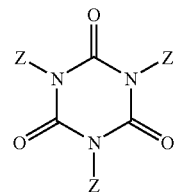

wherein the groups represented by Z are described in further detail in the following paragraphs.

The isocyanurate core may include multiple rings represented by the above structure, including diisocyanurates and other polyisocyanurates. The cured film has excellent resistance to etching, e.g., solvent resistance and resistance to other corrosive chemicals that the cured film is typically exposed to in the ambient environment. The excellent resistance to etching is attributable to the isocyanurate core of the plasticizing component. The isocyanurate core, in addition to resistance to etching, imparts hardness to the cured film. It should be understood that the plasticizing component may be made using commercially available raw materials which, due to the process in which they are made, contain other structures. For example, most commercial sources of isocyanate-functional isocyanurates also contain other oligomerized structures. This fact is known in the art, and these types of materials are still considered to be isocyanurates.

The plasticizing component further includes at least one low surface tension group pending from the isocyanurate core. More specifically, at least one of the groups represented by Z in the above general formula for the isocyanurate core is a low surface tension group, or is reacted with other molecules to form the low surface tension group. As used herein, "low surface tension group" refers to a group that imparts the plasticizing component with a surface tension that is lower than a surface tension of both the resin component and the crosslinking agent. Typically, in order to achieve lower surface tension than both the resin component and the crosslinking agent, the low surface tension group has a higher percentage of hydrocarbons, based on the total number of atoms in the low surface tension group, than either the resin component or the crosslinking agent. While not being restricted to any theory, it is believed that the low surface tension group enables the plasticizing component to migrate to a surface of the cured film during curing, where resistance to cracking and etching is most important since crack propagation initiates at the surface of the cured film. Suitable low surface tension groups that are suitable for purposes of the present invention include a fatty chain, i.e., a hydrocarbon, having at least 6 carbon atoms, a silicon-containing group having at least 1 silicon atom, a fluorocarbon, and combinations thereof. While the fatty chain may have just six carbons, it typically has at least 10 carbon atoms, more typically at least 18 carbon atoms, and may include up to 36 carbon atoms. In one specific example, the fatty chain includes 18 carbon atoms. The silicon-containing group typically includes from 1 to 20, more typically from 1 to 8 silicon atoms. The at least 1 silicon atom of the silicon-containing group may be incorporated into the silicon-containing group by either C—Si bonds or Si—O—Si bonds units, and the fluorocarbon typically has at least 4 fluorine atoms. In most cases the at least 1 silicon atom on the silicon chain will be non-functional. However, under certain circumstances, the at least 1 silicon atom may be functional.

In one embodiment, the low surface tension group is free of cross-linkable functional groups. In this embodiment, the fatty chain typically has at least 8 carbon atoms, as does the fluorocarbon, and the silicon-containing group has at least 1 silicon atom. When the low surface tension group is the silicon-containing group, the silicon-containing group is typically free from cross-linkable functional groups. When the cross-linkable functional groups are absent, the plasticizing component does not react with the crosslinking agent and thus remains free in the cured film. Since the plasticizing component remains free in the cured film, the plasticizing component acts as a plasticizer despite the fact that the isocyanurate core is very hard, as compared to traditional plasticizing components. The low surface tension group, as described above for this embodiment, may intertwine within the cured coating to prevent leaching and depletion of the plasticizing component from the cured film. The low surface tension group is also hydrophobic and causes the plasticizing component to migrate to the surface of the film prior to curing of the film.

In another embodiment, the low surface tension group includes from 0 to 3 cross-linkable functional groups pending therefrom. Typically, the low surface tension group includes, on the average, about one cross-linkable functional group pending therefrom, and may also include one or more non-functional side groups pending therefrom. By pending, it is meant that the groups may be either terminal or pendant on the low surface tension group. Further, the plasticizing component may have more than one low surface tension group. For example, each group represented by Z in the isocyanurate core set forth above may be a low surface tension group, and each of those low surface tension groups may include from 0 to 3 cross-linkable functional groups, but typically have an average of about one cross-linkable functional group pending therefrom. It is also to be appreciated that the isocyanurate core may be a diisocyanurate or a polyisocyanurate, in which case the isocyanurate core may include more groups represented by Z than as set forth in the structure above.

The cross-linkable functional group may be selected from the group of active hydrogen acceptor groups and active hydrogen donor groups, as set forth above in the context of the resin component. Typically, the cross-linkable functional group is a secondary hydroxyl group. When the cross-linkable functional group is present, the plasticizing component may be reactive with the crosslinking agent, the resin component, or both the crosslinking agent and the resin component through the cross-linkable functional group. As such, the specific cross-linkable functional group or groups of the plasticizing component depend upon the specific functional groups of the crosslinking agent and/or the resin component. In one embodiment, the cross-linkable functional group, more specifically a combination of the low surface tension group and the cross-linkable functional group, typically has a reactivity with the crosslinking agent that is less than or equal to a reactivity of the resin component with the crosslinking agent. For example, if the resin component includes carbamate functional groups, the cross-linkable functional group is typically a secondary hydroxyl group, but may also be a carbamate group that may be more sterically hindered than the carbamate group of the resin component. As a result, curing of the plasticizing component is retarded for a sufficient amount of time to allow migration of the plasticizing agent to the surface of the cured film while the resin component and the crosslinking agent are reacting. The slower reaction allows time for the plasticizing component to migrate before reacting to ensure that a sufficient amount of the plasticizing component is adjacent to the surface of the cured film.

In another embodiment, a reaction between the cross-linkable functional group and the crosslinking agent is more thermally reversible than a reaction between the resin component and the crosslinking agent. For example, the cross-linkable group may be a hydroxyl functional group and the crosslinking agent may be an aminoplast. A reaction between the aminoplast and the hydroxyl functional group is reversible. In this embodiment, the resin component typically has carbamate functional groups. A reaction between the aminoplast and the carbamate functional groups is irreversible. The irreversible nature of the reaction between the aminoplast and the carbamate functional groups results in a buildup of free plasticizing component in the curable coating composition as curing progresses, which allows the plasticizing component to migrate within the curable coating composition and a partially cured film formed from the curable coating composition.

In yet another embodiment, when the low surface tension group is the silicon-containing group, the silicon-containing group may be represented by the following structure:

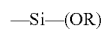

wherein a free valency of the silicon is attached to the isocyanurate core, and R is selected from the group of a $C_1$ to $C_6$ alkyl group, a C(O)R' group, wherein R' comprises a $C_1$ to $C_6$ alkoxy group, and combinations thereof. In this example, the silicon-containing group itself is either non-reactive or reversibly-reactive with the crosslinking agent, which may include, for example, the acid functional group, carbamate functional group, aminoplast functional group, epoxy functional group, etc. As such, the plasticizing component may migrate to the surface of the cured film during curing without reacting with the crosslinking agent. However, once concentrated on the surface of the cured film, the silicon-containing group of this example may undergo self-crosslinking to effectively form linkages between the individual molecules of the plasticizing component.

In yet another embodiment, the low surface tension group includes at least one non-crosslinkable functional group pending therefrom, as an alternative to or in addition to the at least one cross-linkable functional group. The non-crosslinkable functional group may be present to enhance certain properties of the cured film, such as for promoting adhesion. A typical non-crosslinkable functional group may be an epoxy or acid functional group when the crosslinking agent includes hydroxy functional groups, carbamate functional groups, isocyanurate functional groups, or aminoplast functional groups. Further, the non-crosslinkable functional group may be an ultraviolet light-absorbing group of a hindered amine light stabilizing group for enhancing durability of the cured film.

In one embodiment, the low surface tension group is built into the plasticizing component during formation of the isocyanurate core. For example, reactants having an isocyanate group and the low surface tension group may be trimerized to form the isocyanurate with the low surface tension groups pending from the isocyanurate core.

In another embodiment, the low surface tension group and the isocyanurate core are reacted together after formation of the isocyanurate core. Typically, the plasticizing component is the reaction product of an isocyanurate and a compound selected from the group of a) an organocompound comprising at least 6 carbon atoms, b) a silicon-containing group having at least 1 silicon atom, c) a fluorocarbon, and combinations thereof. The compound becomes the low surface tension group in the plasticizing component. The compound has at least one functional group that is reactive with the isocyanurate. In this embodiment, the plasticizing component further includes at least one moiety comprising a urethane group, a urea group, an amide group, an ester group, an ether group, and combinations thereof, which act as a linking group. The linking group connects the low surface tension group to the isocyanurate core. However, it is to be appreciated that it is not critical how the compound is connected to the isocyanurate core. For example, amino alcohols like hydroxy steric amine can be used. The linking group may further include at least one functional side group, such as an acid group, a hydroxyl group, a carbamate group, or any of the functional groups set forth as suitable for the cross-linkable functional group of the low surface tension group. The functional side group may be available to crosslink with the crosslinking agent, the resin component, or both the crosslinking agent and the resin component. Like the cross-linkable functional group of the low surface tension group, the functional side group typically has a reactivity with the crosslinking agent that is less than or equal to the reactivity of the resin component with the crosslinking agent or is reversibly reactive with the crosslinking agent. It is to be appreciated that the functional side group may be absent from the linking group, with the key function of the linking group being to link the low surface tension group and the isocyanurate core. However, it is also to be appreciated that the functional side group may be present to provide crosslinking, in the absence of the cross-linkable functional group of the low surface tension group.

When present, the cross-linkable functional group pending from the low surface tension group is typically separated from the linking group by at least 4 atoms in order to allow the plasticizing component to act as a plasticizer. More specifically, if the linking group is connected to the low surface tension group at a first atom, the cross-linkable functional group is typically connected to the low surface tension group at a fourth atom in the chain counting away from the first atom, and may be connected to any atom of the low surface tension group that is further from the first atom than the fourth atom. It is to be appreciated, however, that in some instances, the cross-linkable functional group may be less than 4 atoms from the linking group while still providing the cured film with acceptable resistance to cracking and etching.

Optionally, a moiety comprising from 1 to 12 carbon atoms may be disposed between the isocyanurate core and the linking group to function as a connecting group. The presence or absence of the connecting group depends upon the specific compounds that are reacted to form the plasticizing component. More specifically, the presence or absence of the connecting group depends upon the specific compound that is reacted to form the isocyanurate core. These connecting groups may also contain heteroatoms selected from the list of oxygen, nitrogen, phosphorus, silane, and mixtures thereof. Further, one or more of the connecting groups may include the functional side group as set forth above. One non-limiting example of a suitable plasticizing component including the isocyanurate core, the low surface tension group, the linking group, the cross-linkable functional group, and the connecting group is of the general structure:

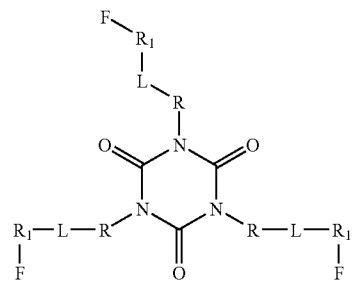

wherein R represents the moiety comprising from 0 to 12 carbon atoms that functions as the connecting group, L represents the moiety comprising the urethane group, the urea group, the amide group, the ester group, or the ether group, and combinations thereof, which acts as the linking group, $R_1$ represents the low surface tension group, and F represents the cross-linkable functional group selected from the group of the hydroxyl group, the carbamate group, the alkoxy group, the epoxy group, the acid group, the amino group, and combinations thereof.

It is to be appreciated that R may contribute to the low surface tension properties of the plasticizing component, and that greater amounts of carbon in R, within the ranges as set forth above, may require lesser amounts of carbon in $R_1$, within the ranges as set forth above, in order to achieve sufficient low surface tension properties of the plasticizing component.

A more specific example of the plasticizing component including the isocyanurate core, the low surface tension group, the linking group, the cross-linkable functional group, and the connecting group is of the following general structure, in which L, $R_1$, and F are the same as described above:

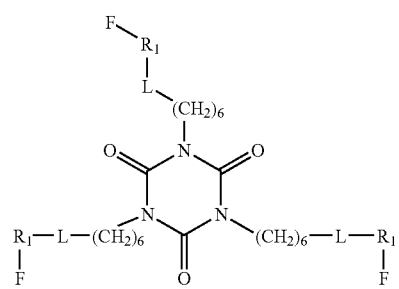

Another even more specific example of the plasticizing component including the isocyanurate core, the low surface tension group, the linking group, the cross-linkable functional group, and the connecting group is of the general structure, in which L is the same as described above:

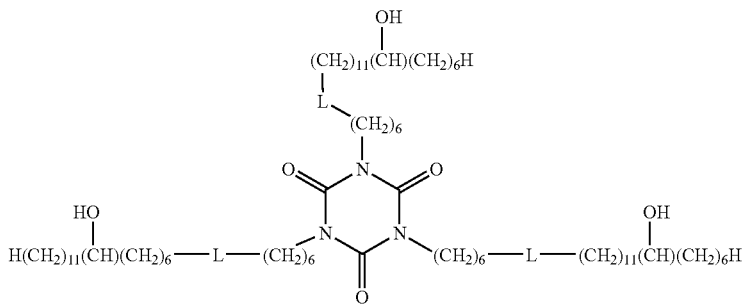

Another non-limiting example of a suitable plasticizing component including the isocyanate core, the low surface tension group, the linking group, and the cross-linkable functional group is of the following general structure:

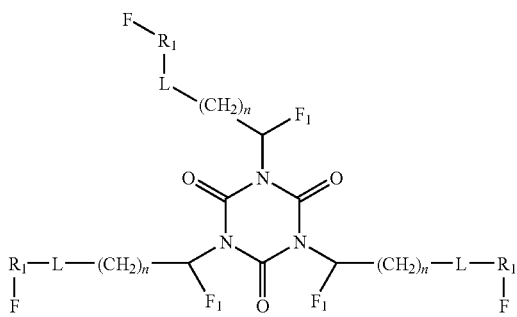

wherein n is from 1 to 3, L is either an ether or an ester group, $F_1$ is a secondary hydroxyl group, and $R_1$ and F are the same as set forth above. F is optional because $F_1$ may provide sufficient cross-linkable functionality such that F may not be required.

One non-limiting example of a suitable plasticizing component including the isocyanurate core, the low surface tension group, the linking group, and the connecting group is of the general structure:

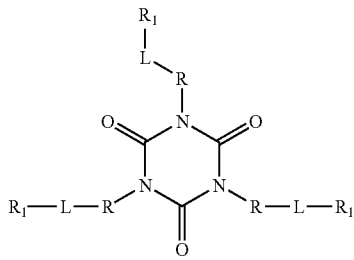

wherein R, L and $R_1$ are the same as above, with $R_1$ typically selected from the group of the fatty chain having at least 8 carbon atoms, the fluorocarbon having at least 8 carbon atoms, and the silicon-containing group having at least 1 silicon atom. In this embodiment, the silicon-containing group may represented by the structure —Si—(OR)

as set forth above, and may be capable of self crosslinking upon migration to the surface of the cured film.

The isocyanurate is typically an isocyanurate of a difunctional or polyfunctional molecule having at least one isocyanate group. The at least one isocyanate group of the difunctional or polyfunctional molecule reacts through a trimerization reaction to form the isocyanurate core. Alternatively, the difunctional or polyfunctional molecule may be urea. The urea may be heated to produce $NH_3[NCO]$, which may then further react to form the isocyanurate.

The difunctional or polyfunctional molecule also includes at least one moiety that is reactive with the at least one functional group of the compound. For the isocyanurate that is formed from urea, the isocyanurate may be further reacted with other molecules, such as with an epoxy, to provide the moiety that is reactive with the at least one functional group of the compound. The resulting isocyanurate has three branches extending from the isocyanate core, with each branch having at least one functional group pending therefrom. The isocyanurate typically has the following structure:

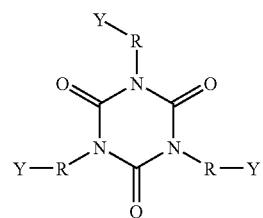

wherein R is optional and represents the moiety comprising from 0 to 12 carbon atoms and Y comprises the at least one moiety that is reactive with the at least one functional group of the compound. Y may be selected from the group of hydrogen, an isocyanate group, an epoxide group, a hydroxyl group, an amino group, an amido group, a carbamate group, an acid group, a vinyl group, a urea group, a cyclic carbonate group, and combinations thereof, depending on the specific at least one functional group of the compound that is reactive with the isocyanurate core.

Typically, the isocyanurate is selected from the group of isocyanurates of diisocyanates, triglycidyl isocyanurates, trishydroxyalkyl isocyanurates, and trialkanoic isocyanurates. In one preferred embodiment, the isocyanurate is further defined as a hexamethylene diisocyanate (HDI) trimer including an isocyanurate ring. More specifically, the isocyanurate is formed from HDI. In this instance, R in the structures represented above is a moiety having 6 carbon atoms, due to the hexamethylene portion of the HDI. Other specific examples of isocyanurates that are suitable for purposes of the present invention include triglycidyl isocyanurate, trihydroxyethyl isocyanurate, and trispropionic acid isocyanurate. However, it is to be appreciated that the isocyanurates may be made from any diisocyanate with based on the formula OCN—R—NCO, where R is any carbon chain, cyclic or bicyclic structure that contains from 4 to 20 carbon atoms, with Y pending from R as set forth above. It is also to be appreciated that the isocyanurates may be made from urea, as set forth above, and further reacted with other molecules to provide the moiety that is reactive with the at least one functional group of the compound. It is appreciated by those of skill in the art that the isocyanurate, as described herein and represented by the above structure, is merely an idealized structure and that most commercially available isocyanurate compositions include mixtures of materials, one of which is the isocyanurate represented by the above structure.

As set forth above, the compound that is reactive with the isocyanurate may be the organocompound, the silicon-containing group, the fluorocarbon, and combinations thereof. The organocompound typically has at least 6 carbon atoms and forms the fatty chain that is described in detail above as suitable for the low surface tension group. The compound has at least one functional group, and may have at least two functional groups. At least one of the functional groups is reactive with the isocyanurate in order to form the linking group and to link the compound and the isocyanurate. More specifically, the at least one functional group reactive with the isocyanurate may be selected from the group of a hydroxyl group, an amino group, an amido group, a carbamate group, an acid group, an anhydride group, an isocyanate group, and combinations thereof. For example, when the isocyanurate of the diisocyanate is used, in which case each branch has the single isocyanate group pending therefrom, the compound has at least one isocyanate-reactive functional group such as a hydroxyl group. As another example, when the isocyanurate has hydroxyl groups pending therefrom, the compound has at least one hydroxyl-reactive functional group such as an acid group, and anhydride group, an isocyanate group, and combinations thereof. As yet another example, when the isocyanurate has epoxy groups pending therefrom, the compound has at least one epoxy-reactive functional group such as an acid group. Depending on the specific functional group of the compound that is reactive with the isocyanurate of the diisocyanate, the linking group, represented by L above in the general structure of the plasticizing component, is at least one of a urethane, a urea, an amide, an ester, an ether, and combinations thereof.

When the compound that is reactive with the isocyanurate includes the at least two functional groups, at least one of the functional groups is reactive with the functional group of the isocyanurate and at least one of the at least two functional groups may be the cross-linkable functional group. Alternatively or in addition to the cross-linkable functional group, at least one of the at least two functional groups may be the non-crosslinkable functional group. The cross-linkable and non-crosslinkable functional groups are described in detail above.

When the functional groups on the isocyanurate core are reactable with hydroxy groups, specific examples of suitable organocompounds for purposes of the present invention that contain the crosslinkable functional group include diols such as 1,12-octadecanediol, 2-ethyl-1,3-hexanediol, 12-hydroxysteric acid, and the reaction between the isocyanurate core and the organocompound may be followed by reaction with an epoxy such as Glydexx N10, commercially available from ExxonMobile Corporation of Irving, Tex. Suitable silicon-containing groups for purposes of the present invention include trimethyl hydroxypropyl silane, heptamethyl hydroxypropyl trisiloxane and hydroxy functional silicone oils like polydimethylsiloxane carbonal terminated. When the silicone oil is used, it is generally preferred that its molecular weight be under 3000 Daltons. Suitable fluorocarbons for purposes of the present invention include perfluorohexan-1-ol, perfluoroethanol, and the reaction product of perfluoroacetic acid with epoxies like Glydexx N10.

The plasticizing component is present in the curable coating composition in an amount of at least 2 parts by weight solids, more typically in an amount of from about 2 to about 30 parts by weight solids, most typically in an amount of from about 5 to about 20 parts by weight solids, based on 100 parts by weight of all solids in the curable coating composition. When present in the above amounts, the cured films are obtained that have the excellent resistance to cracking and etching.

Excellent resistance to cracking and etching is compared across cured films formed from curable coating compositions including different plasticizing components. More specifically, cured films formed from curable coating compositions including the plasticizing component are compared to cured films formed from curable coating compositions including other plasticizing components that do not meet the requirements of the plasticizing component as described above.

Resistance to cracking is determined using a weatherometer. Specifically, the cured film is sandblasted. The sand is used in a gravelometer at low pressure of approximately 2-3 psi to create a minor coating defect. About 5 to 10 grams of sand is used to blast a 2 inch by 3 inch panel surface. The sandblasted cured coating is then placed in the weatherometer, wherein the defects may propagate into cracks with systems that have a high degree of internal stress.

Determination of resistance to cracking is based on a scale of from 1 to 5, with 1 being high resistance to cracking and 5 being low resistance to cracking. In other words, a value of 1 would indicate that little or no cracking is observed, while a value of 5 would indicate significant cracking and crack propagation. The specific resistance to cracking of a given cured film is determined by comparing the cured film to standardized samples that fall within the scale of from 1 to 5. The cured films of the present invention have resistance to cracking of from 1 to 3 after 1000 hours of subjecting the cured films to sandblasting, which is on par with resistance to cracking provided by existing plasticizing components and which is greater than resistance to cracking that is achieved when no plasticizing component is used.

Resistance to etching, e.g., solvent resistance and resistance to other corrosive chemicals that the cured film is typically exposed to in the ambient environment, is determined by field exposure using a visual rating technique that is generally accepted in the automotive coatings industry. Resistance to etching is determined on a scale of from 1 to 10 by comparison to standardized samples that fall within the scale of from 1 to 10.

The cured films of the present invention have a resistance to etching of from 1 to 6 after 8 weeks of subjecting the cured films to a field environment in Jacksonville, Fla., depending on the amount of the plasticizing component that is included in the curable coating composition. More specifically, cured films formed from the curable coating composition including the plasticizing component in an amount of about 5 parts by weight solids based on 100 parts by weight of solids in the curable coating composition, have resistance to etching of about 6 after exposure to the Jacksonville field environment for 8 weeks. Cured films formed from the curable coating composition including about 20 parts by weight solids of the plasticizing component, based on 100 parts by weight of solids in the curable coating composition, have resistance to etching of from about 2 to 4, typically about 2, after sandblasting for 8 weeks. The resistance to etching provided by the plasticizing component is greater than that provided when no plasticizing component is present, as illustrated in the Examples below.

The following examples are meant to illustrate the present invention and are not to be view in any way as limiting to the scope of the invention.

EXAMPLES

Curable coating compositions of the present invention including the plasticizing component are applied onto a steel substrate and cured at a temperature of about 275° C. for a period of about 20 to 30 minutes to form cured films. The curable coating compositions include the components in the amounts indicated in Table 1. The amounts shown are in parts by weight solids based on the 100 parts by weight of solids in the curable coating composition unless otherwise indicated.

TABLE 1

| Component | Example 1 | Example 2 | Example 3 | Example 4 |
|---|---|---|---|---|
| Resin Component | 60.0 | 60.0 | 75.0 | 75.0 |
| Crosslinking Agent | 18.5 | 18.5 | 18.5 | 18.5 |
| Catalyst | 1.5 | 1.5 | 1.5 | 1.5 |
| Plasticizing Component A | 20.0 | 0.0 | 5.0 | 0.0 |
| Plasticizing Component B | 0.0 | 20.0 | 0.0 | 5.0 |
| Plasticizing Component C | 0.0 | 0.0 | 0.0 | 0.0 |
| Plasticizing Component D | 0.0 | 0.0 | 0.0 | 0.0 |
| Total | 100.0 | 100.0 | 100.0 | 100.0 |
| Solvent, parts by weight based on 100 parts by weight of curable coating composition | 50.0 | 50.0 | 50.0 | 50.0 |

| Component | Example 5 | Example 6 | Example 7 | Example 8 |
|---|---|---|---|---|
| Resin Component | 60.0 | 60.0 | 75.0 | 75.0 |
| Crosslinking Agent | 18.5 | 18.5 | 18.5 | 18.5 |
| Catalyst | 1.5 | 1.5 | 1.5 | 1.5 |
| Plasticizing Component A | 0.0 | 0.0 | 0.0 | 0.0 |
| Plasticizing Component B | 0.0 | 0.0 | 0.0 | 0.0 |
| Plasticizing Component C | 20.0 | 0.0 | 0.0 | 5.0 |
| Plasticizing Component D | 0.0 | 20.0 | 5.0 | 0.0 |
| Total | 100.0 | 100.0 | 100.0 | 100.0 |
| Solvent, parts by weight based on 100 parts by weight of curable coating composition | 50.0 | 50.0 | 50.0 | 50.0 |

Resin Component is dual-hydroxy carbamate-functional acrylate.

Crosslinking Agent is a methylated melamine-formaldehyde crosslinking agent with a medium to high degree of alkylation, low methylol content and medium to high imino functionality, commercially available from Cytec Industries, Inc. of West Patterson, N.J.

Catalyst is blocked DDBSA.

Plasticizing Component A is the reaction product of an isocyanurate of hexamethylene diisocyanate and 1,12-octadecanediol.

Plasticizing Component B is the reaction product of an isocyanurate of hexamethylene diisocyanate and 2-ethyl-1,3-hexanediol.

Plasticizing Component C is the reaction product of an isocyanurate of hexamethylene diisocyanate and 2-ethylhexanol.

Plasticizing Component D is the reaction product of an asymmetric isocyanurate of hexamethylene diisocyanate and 2-ethylhexanol.

The cured films are subjected to testing for resistance to cracking and etching. For resistance to etching, the cured films are exposed to a field environment in Jacksonville, Fla. Resistance to etching is observed at 8 weeks and 14 weeks. For resistance to cracking, the cured films are subjected to sandblasting in a gravelometer at low pressure of approximately 2-3 psi. About 5 to 10 grams of sand is used to blast a 2 inch by 3 inch panel surface. The sandblasted cured coating is then placed in the weatherometer, wherein the defects may propagate into cracks with systems that have a high degree of internal stress. Resistance to cracking is observed at 500 hours and 1000 hours. Resistance to cracking and etching of the cured films is indicated in Table 2.

TABLE 2

| Example | Etch, 8 wks | Etch, 14 wks | Cracking, 500 hrs | Cracking, 1000 hrs |
|---|---|---|---|---|
| Example 1 | 2 | 6 | — | 2 |
| Example 2 | 4 | 6 | 2 | 2 |
| Example 3 | 6 | — | 2 | 2 |
| Example 4 | 6 | — | 1 | 2 |
| Example 5 | 5 | 6 | 2 | 2 |
| Example 6 | 6 | 8 | 2 | 2 |
| Example 7 | 5 | 9 | 2 | 2 |
| Example 8 | 6 | 9 | 2 | 2 |

COMPARATIVE EXAMPLES

Curable coating compositions absent plasticizing components are used for the Comparative Examples. The curable coating compositions are applied onto a steel substrate and cured at a temperature of about 275° C. for a period of about 20 to 30 minutes to form Comparative Examples of cured films. The Comparative Examples of the curable coating compositions include the components in the amounts indicated in Table 3.

TABLE 3

| Component | Comparative Ex. 1 | Comparative Ex. 2 |
|---|---|---|
| Resin Component | 80.0 | 80.0 |
| Crosslinking Agent | 18.5 | 18.5 |
| Catalyst | 1.5 | 1.5 |
| Total | 100.0 | 100.0 |
| Solvent, parts by weight based on 100 parts by weight of curable coating composition | 50.0 | 50.0 |

The cured films of the Comparative Examples are subjected to the same tests for resistance to cracking and etching as described above for the Examples. Resistance to cracking and etching of the Comparative Example cured films is indicated in Table 4.

TABLE 4

| Example | Etch, 8 wks | Etch, 14 wks | Cracking, 500 hrs |
| --- | --- | --- | --- |
| Comp. Ex. 1 | 4 | 4 | 5 |
| Comp. Ex. 2 | 5 | 5 | 5 |

RESULTS

With reference to the resistance to cracking and etching of the Examples and the Comparative Examples, it is apparent that the cured films formed from the curable coating composition of the present invention including the plasticizing component exhibit resistance to etching that is on par with the resistance to etching of cured films formed from the curable coating compositions of the Comparative Example. The cured films of the Examples have dramatically improved resistance to cracking when compared to the resistance to cracking of the Comparative Examples. As such, it is shown that the plasticizing component of the present invention provides improved resistance to cracking with resistance to etching that is on par with resistance to etching of coating compositions that do not include the plasticizing component.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A plasticizing component for a curable coating composition, said plasticizing component comprising:
    an isocyanurate core; and
    at least one low surface tension group pending from said isocyanurate core, with said low surface tension group selected from the group of a) a fatty chain having at least 6 carbon atoms, b) a silicon-containing group having at least 1 silicon atom, c) a fluorocarbon, and combinations thereof, and with said low surface tension group having from 0 to 3 cross-linkable functional group(s) pending therefrom, wherein said plasticizing component is of the general structure:

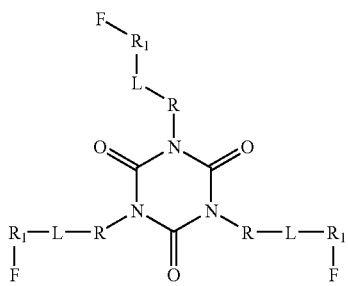

wherein R represents a moiety comprising from 0 to 12 carbon atoms provided that R is free from oxygen heteroatoms,
L represents at least one moiety comprising a urethane group, a urea group, an amide group, an ester group, and combinations thereof provided that L is free from ether groups,
$R_1$ represents said low surface tension group, and
F is optional and represents said cross-linkable functional group, and
wherein said plasticizing component comprises the reaction product of:
    an isocyanurate; and
    a compound selected from the group of a) an organo-compound comprising at least 6 carbon atoms, b) a silicon-containing group having at least 1 silicon atom, c) a fluorocarbon, and combinations thereof, with said compound having at least one functional group reactive with said isocyanurate.

2. A plasticizing component as set forth in claim 1 wherein said at least one functional group reactive with said isocyanurate is selected from the group of an isocyanate group, an epoxide group, a hydroxyl group, an amino group, an amido group, a carbamate group, an acid group, a vinyl group, a urea group, a cyclic carbonate group, and combinations thereof.

3. A plasticizing component as set forth in claim 1 wherein said compound has a second functional group that is said cross-linkable functional group.

4. A plasticizing component as set forth in claim 3 wherein said functional groups in said compound are separated by at least 4 carbon atoms.

5. A plasticizing component as set forth in claim 1 wherein said isocyanurate has the following structure:

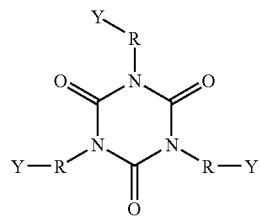

wherein R is optional and represents a moiety comprising from 0 to 12 carbon atoms and Y comprises at least one moiety reactive with at least one functional group of said compound.

6. A plasticizing component as set forth in claim 5 wherein Y is reactive with said at least one functional group of said compound and is selected from the group of hydrogen, an isocyanate group, an epoxide group, a hydroxyl group, an amino group, an amido group, a carbamate group, an acid group, a vinyl group, a urea group, a cyclic carbonate group, and combinations thereof.

7. A plasticizing component as set forth in claim 6 wherein said isocyanurate is selected from the group of isocyanurates of diisocyanates, triglycidyl isocyanurates, trishydroxyalkyl isocyanurates, and trialkanoic isocyanurates.

8. A plasticizing component as set forth in claim 1 wherein
    F is present and represents a cross-linkable functional group selected from the group of active hydrogen acceptor groups and active hydrogen donor groups.

9. A plasticizing component as set forth in claim 8 wherein F represents a secondary hydroxyl group pending from $R_1$ and separated from L by at least 4 carbon atoms.

10. A plasticizing component as set forth in claim 1, wherein said plasticizing component is of the general structure:

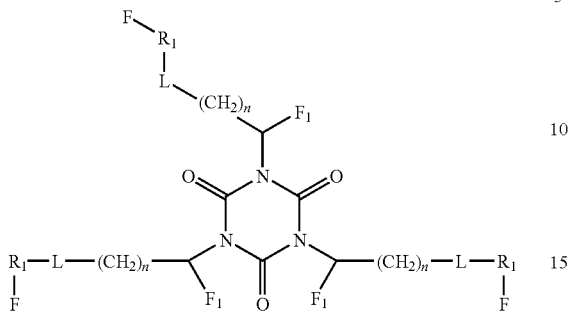

wherein $F_1$ is a secondary hydroxyl group,
n is from 1 to 3,
L is either an ether or an ester group,
$R_1$ represents at least one of a fatty chain comprising at least 6 carbon atoms, a silicon-containing group having at least 1 silicon atom, a fluorocarbon, and combinations thereof, and
F is optional and represents a cross-linkable functional group selected from the group of active hydrogen acceptor groups and active hydrogen donor groups.

11. A plasticizing component as set forth in claim 1 wherein said plasticizing component is of the general structure:

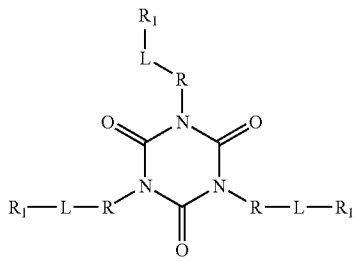

wherein R represents a moiety comprising from 0 to 12 carbon atoms provided that R is free from oxygen heteroatoms,
L represents at least one moiety comprising a urethane group, a urea group, an amide group, an ester group, and combinations thereof provided that L is free from ether groups,
$R_1$ represents said low surface tension group.

12. A plasticizing component of the general structure:

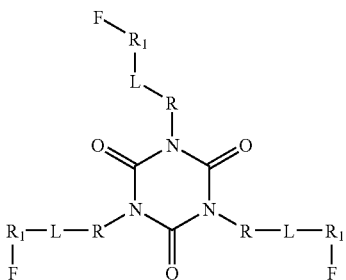

wherein R represents a moiety comprising from 0 to 12 carbon atoms,
L represents at least one moiety comprising a urethane group, a urea group, an amide group, an ester group, an ether group, and combinations thereof,
$R_1$ represents a low surface tension group selected from the group of a) a fatty chain comprising at least 6 carbon atoms, b) a silicon-containing group having at least 1 silicon atom, c) a fluorocarbon, and combinations thereof, and
F represents a cross-linkable functional group selected from the group of active hydrogen acceptor groups and active hydrogen donor groups.

13. A plasticizing component as set forth in claim 12 of the general structure:

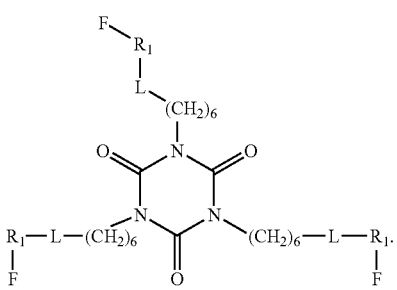

14. A plasticizing component as set forth in claim 12 of the general structure:

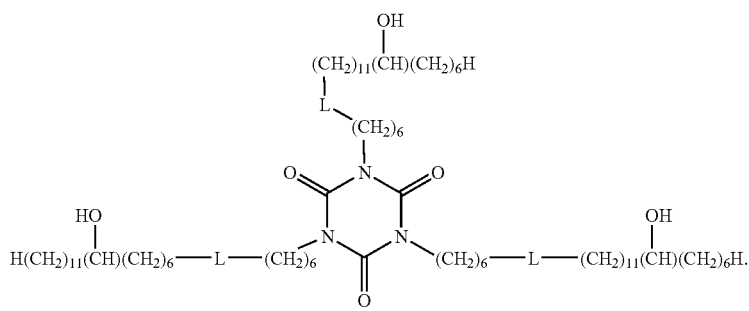

15. A curable coating composition comprising:
a resin component;
a crosslinking agent reactive with said resin component; and
a plasticizing component comprising the reaction product of:
an isocyanurate; and
a compound selected from the group of a) an organocompound comprising at least 6 carbon atoms, b) a silicon-containing group having at least 1 silicon atom, c) a fluorocarbon, and combinations thereof, with said compound having at least one functional group reactive with said isocyanurate.

16. A curable coating composition as set forth in claim 15 wherein said at least one functional group reactive with said isocyanurate is selected from the group of an isocyanate group, an epoxide group, a hydroxyl group, an amino group, an amido group, a carbamate group, an acid group, a vinyl group, a urea group, a cyclic carbonate group, and combinations thereof.

17. A curable coating composition as set forth in claim 15 wherein said compound has a second functional group that is said cross-linkable functional group.

18. A curable coating composition as set forth in claim 17 wherein said functional groups in said compound are separated by at least 4 carbon atoms.

19. A curable coating composition as set forth in claim 15 wherein said plasticizing component thereof comprises the reaction product of isocyanurate of the following structure:

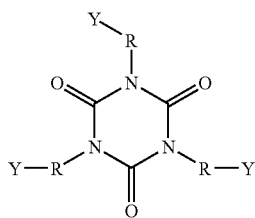

wherein R is optional and represents a moiety comprising from 0 to 12 carbon atoms and Y comprises at least one moiety reactive with said at least one functional group of said compound.

20. A curable coating composition as set forth in claim 19 wherein said isocyanurate comprises as Y, a moiety reactive with said at least one functional group of said compound and is selected from the group of hydrogen, an isocyanate group, an epoxide group, a hydroxyl group, an amino group, an amido group, a carbamate group, an acid group, a vinyl group, a urea group, a cyclic carbonate group, and combinations thereof.

21. A curable coating composition as set forth in claim 20 wherein the isocyanurate is selected from the group of isocyanurates of diisocyanates, triglycidyl isocyanurates, trishydroxyalkyl isocyanurates, and trialkanoic isocyanurates.

22. A curable coating composition as set forth in claim 15 wherein said plasticizing component thereof is of the general structure:

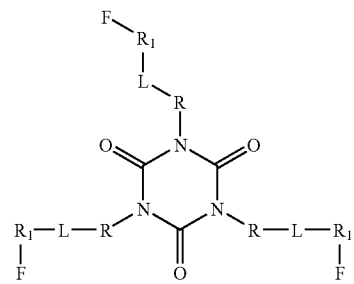

wherein R represents a moiety comprising from 0 to 12 carbon atoms,
L represents at least one moiety comprising a urethane group, a urea group, an amide group, an ester group, an ether group, and combinations thereof,
$R_1$ represents at least one of a fatty chain comprising at least 6 carbon atoms, a silicon-containing group having at least 1 silicon atom, a fluorocarbon, and combinations thereof, and
F represents a cross-linkable functional group selected from the group of active hydrogen acceptor groups and active hydrogen donor groups.

23. A curable coating composition as set forth in claim 22 wherein said plasticizing component thereof comprises as F a secondary hydroxyl group pending from $R_1$ and separated from L by at least 4 carbon atoms.

24. A curable coating composition as set forth in claim 15 wherein said plasticizing component thereof is of the general structure:

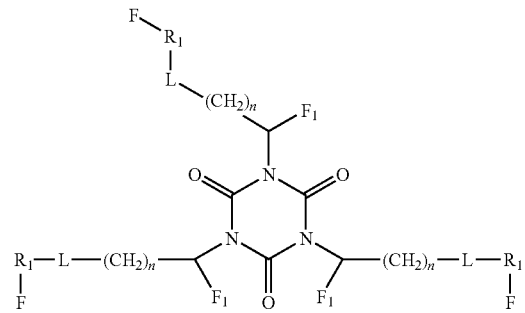

wherein $F_1$ is a secondary hydroxyl group,
n is from 1 to 3,
L is either an ether or an ester group,
$R_1$ represents at least one of a fatty chain comprising at least 6 carbon atoms, a silicon-containing group having at least 1 silicon atom, a fluorocarbon, and combinations thereof, and
F is optional and represents a cross-linkable functional group selected from the group of active hydrogen acceptor groups and active hydrogen donor groups.

25. A curable coating composition as set forth in claim 15 wherein said plasticizing component thereof is of the general structure:

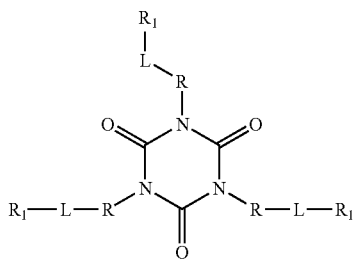

wherein R represents a moiety comprising from 0 to 12 carbon atoms,
- L represents at least one moiety comprising a urethane group, a urea group, an amide group, an ester group, an ether group, and combinations thereof,
- $R_1$ represents said low surface tension group.

26. A curable coating composition as set forth in claim 15 wherein said plasticizing component thereof comprises as said cross-linkable functional group a group having reactivity with said crosslinking agent that is less than or equal to a reactivity of said resin component with said crosslinking agent.

27. A curable coating composition as set forth in claim 15 wherein a reaction between said cross-linkable group on said plasticizing component and said crosslinking agent is reversible.

28. A curable coating composition as set forth in claim 15 wherein said plasticizing component thereof comprises a cross-linkable functional group selected from the group of active hydrogen acceptor groups and active hydrogen donor groups.

29. A curable coating composition as set forth in claim 15 wherein said plasticizing component thereof is present in an amount of at least 2 parts by weight solids based on 100 parts by weight of all solids in the curable coating composition.

30. A curable coating composition as set forth in claim 15 wherein said resin component is selected from the group of polymers, oligomers, materials, and combinations thereof.

31. A curable coating composition as set forth in claim 15 wherein said resin component has functional groups having a reactivity with said crosslinking agent that is greater than or equal to a reactivity of said cross-linkable functional group of said plasticizing component with said crosslinking agent.

32. A curable coating composition as set forth in claim 15 wherein said crosslinking agent comprises at least two crosslinking groups selected from the group of active hydrogen acceptor groups and active hydrogen donor groups.

33. A cured film formed from said curable coating composition of claim 15.

* * * * *